March 25, 1969  W. B. CONRAD  3,434,501
MOTION TRANSMITTING REMOTE CONTROL ASSEMBLY
Original Filed May 19, 1966
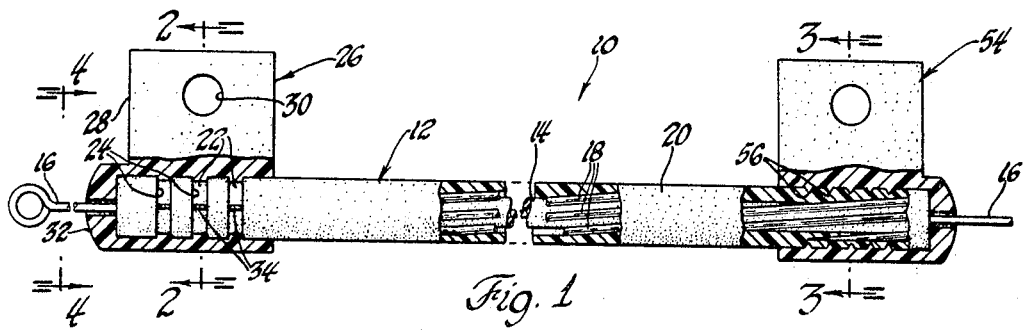
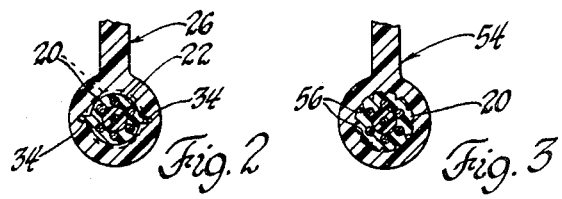
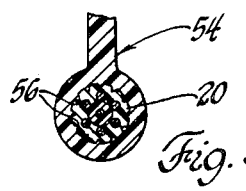
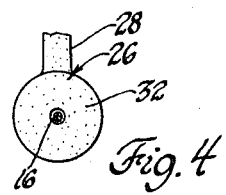
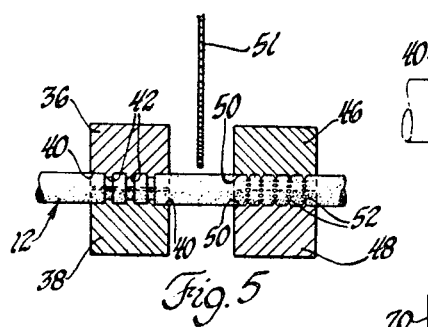
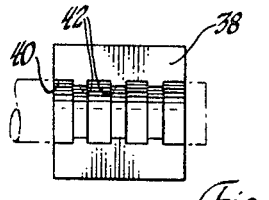
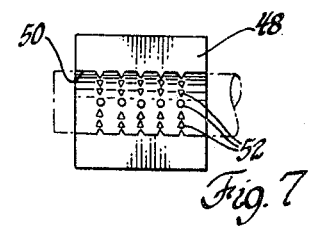
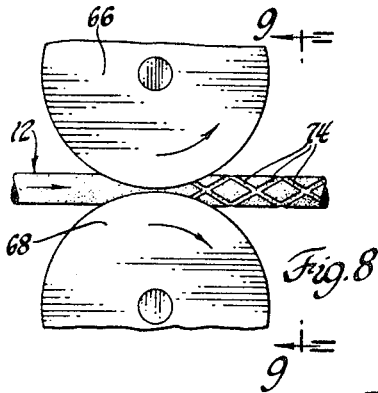
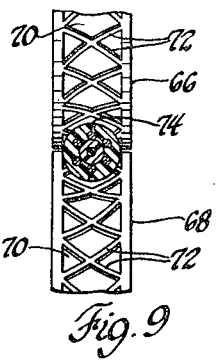
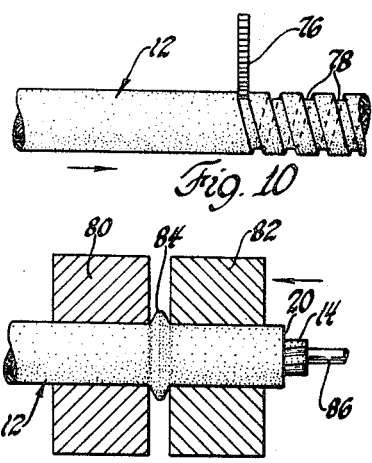
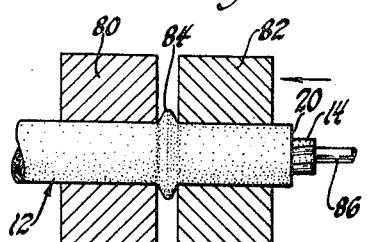
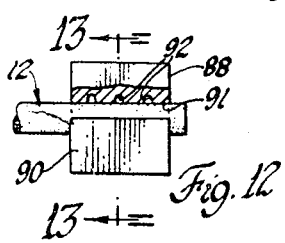
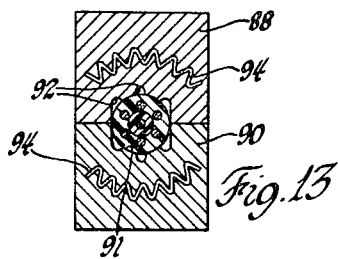
INVENTOR.
Winthrop B. Conrad
BY
Barnard, McGlynn & Reising
ATTORNEYS United States Patent Office 3,434,501
Patented Mar. 25, 1969

3,434,501
MOTION TRANSMITTING REMOTE
CONTROL ASSEMBLY
Winthrop B. Conrad, Franklin, Mich., assignor to Teleflex Incorporated, North Wales, Pa., a corporation of Delaware
Original application May 19, 1966, Ser. No. 551,422. Divided and this application Feb. 13, 1967, Ser. No. 615,694
Int. Cl. F16l 9/12
U.S. Cl. 138—109                                21 Claims

ABSTRACT OF THE DISCLOSURE

A motion transmitting remote control assembly including a flexible conduit having an inner tubular member of organic polymeric material with a plurality of wires wrapped helically thereabout on a long lead and a casing of organic polymeric material enclosing the wires with irregularities, such as grooves, indentations or the like, formed in the surface of the casing, and a fitting of organic polymeric material adapted for attachment to a support structure being molded so that it is disposed in mechanical interlocking engagement with the casing.

---

This application is a division of application Serial No. 551,422, filed May 19, 1966, in the name of Winthrop B. Conrad and assigned to the assignee of the instant invention, and now abandoned.

Motion transmitting remote control assemblies of the type to which the instant invention pertains are frequently utilized in marine, aircraft and automotive installations and usually include a conduit with fittings disposed adjacent each end for attaching the conduit to a support structure, and a motion transmitting core element movably disposed in the conduit. One end of the core element is usually adapted to be manually moved and the other end is adapted to be attached to a control member of adevice to be actuated. Assemblies of this type are frequently utilized in automobiles to control such things as vents, heaters, and the like. A typical conduit utilized in such assemblies includes an inner tubular element of organic polymeric material with a plurality of wires wrapped about the inner tubular member on a long lead and a casing of organic polymeric material surrounding the wires and the inner tubular member. Fittings are secured to the casing and are adapted to be secured to a support structure.

Fittings utilized to support such conduits must not apply excessive radial forces to the conduit because such forces deform the conduit to interfere with the movement of the motion transmitting core element. The fittings, however, must be secured to the conduit sufficiently to prevent relative axial movement between the conduit and the fitting to prevent the conduit from being pulled from the fitting. Furthermore, when a fitting is utilized to support a plastic-encased conduit of the type utilizing a plurality of wires helically wound around an inner tubular element, the fitting must, in addition to maintaining the conduit substantially free of excessive radial forces while preventing axial movement of the conduit within the fitting, allow movement of the individual wires relative to one another and relative to the inner tubular member and the outer plastic casing so that the conduit is flexible along its entire length.

One type of fitting which has heretofore been utilized is one which is clamped about the conduit. Such fittings have not proven satisfactory in the remote control assemblies utilizing a conduit of the type mentioned above because, in order to obtain sufficient frictional gripping between the fitting and the outer plastic casing of the conduit, the fitting applies excessive radial forces to the conduit to deform the conduit and interfere with the movement of the motion transmitting core element. Another type fitting heretofore utilized is one made of plastic or organic polymeric material and molded about the casing of the conduit so that the organic polymeric material of the casing of the conduit is diffused into the organic polymeric material of the fitting, and vice versa. In order to obtain a diffusion of the organic polymeric material of the casing with the organic polymeric material of the fitting, however, it is necessary that the organic polymeric material of the fitting be compatible for such bonding to the organic polymeric material of the casing. It is frequently necessary to form the fitting of an organic polymeric material having high strength characteristics, yet such organic polymeric materials are frequently not compatible for bonding to the organic polymeric material preferably utilized in the outer casing of the conduit. When a fitting of an organic polymeric material compatible for bonding to the organic polymeric material of the casing is molded about the casing, there is no diffusion between the organic polymeric materials of the fitting and the casing, and there is not sufficient frictional contact between the fitting and the casing of the conduit to prevent the conduit from being pulled from the fitting under normal operating conditions.

One attempt to solve this problem has been to force the organic polymeric material of the fitting into the casing. This has not proven satisfactory, however, since it results in a concave or arcuately shaped depression in the conduit with the fitting having a mating projection. Such a construction is sometimes suitable for assemblies wherein the motion transmitting core element rotates within the conduit and the axial forces tending to pull the conduit from the end fitting are inconsequential. However, such a structure is not satisfactory when the motion transmitting core element is slidably disposed in the conduit and applies significant axial forces tending to remove the conduit from the fitting because the arcuate interconnection formed as the fitting is forced onto the conduit to deform the conduit does not provide sufficient retention of the conduit within the fitting.

Accordingly, it is an object and feature of this invention to provide a motion transmitting remote control assembly having a conduit with an outer surface or organic polymeric material with irregularities preformed along the outer surface of the conduit and a fitting of organic polymeric material molded about the conduit and the irregularities so that the fitting is disposed in mechanical interlocking engagement with the conduit.

In general, these and other objects and features of this invention may be attained in a motion transmitting remote control assembly including a conduit having an inner tubular member of organic polymeric material with a bore therethrough for movably supporting a motion transmitting core element, a plurality of wires wrapped helically about the inner tubular member on a long lead, and an outer smooth tubular casing of organic polymeric material enclosing the wires and the inner tubular member. Irregularities are formed in the surface of the outer casing without deforming the wires and without decreasing the inner diameter of the casing. In one preferred embodiment, the irregularities take the form of annular grooves disposed circumferentially about the casing with the sides of the grooves being substantially perpendicular to the longitudinal axis of the conduit. A fitting of organic polymeric material is molded about the conduit with portions of the fitting disposed in the grooves so that the fitting is in mechanical interlocking engagement with the casing of the conduit. In another preferred embodiment, the irregularities are formed by forcing a plurality of spikes into the casing of the conduit and thereafter molding a fitting of organic polymeric material about the casing so that portions of the fitting are disposed in the irregularities formed by the spikes to provide mechanical interlocking engagement between the fitting and the casing of the conduit. In a further embodiment, the irregularities are formed by at least one projection resulting from deforming the organic polymeric material of the casing with the fitting of organic polymeric material molded about the projection so that the fitting is in mechanical interlocking engagement with the casing of the conduit. In a still further embodiment, the irregularities are formed by a groove cut into the casing and the fitting of organic polymeric material is molded about the groove so that the fitting is in mechanical interlocking engagement with the casing of the conduit.

Other objects and attendant advantages of the present invention will be readily appreciated as the same becomes better understood by reference to the following detailed description when considered in connection with the accompanying drawings wherein:

FIGURE 1 is a view partially broken away and in cross section of a preferred embodiment of the instant invention;

FIGURE 2 is a fragmentary cross-sectional view taken substantially along line 2—2 of FIGURE 1;

FIGURE 3 is a fragmentary cross-sectional view taken substantially along line 3—3 of FIGURE 1;

FIGURE 4 is a view taken substantially along line 4—4 of FIGURE 1;

FIGURE 5 is a cross-sectional view showing an embodiment of means for forming irregularities in the conduit;

FIGURE 6 is a view showing another embodiment of means for forming the irregularities in the conduit;

FIGURE 7 is a view showing still another embodiment of means for forming the irregularities in the conduit;

FIGURE 8 is a view of yet another embodiment of means for forming the irregularities in the conduit;

FIGURE 9 is a view taken substantially along line 9—9 of FIGURE 8;

FIGURE 10 is a view showing a further embodiment of means for forming the irregularities in the conduit;

FIGURE 11 is a view showing a still further embodiment of means for forming the irregularities in the conduit;

FIGURE 12 is a view showing another embodiment of means for forming the irregularities in the conduit; and FIGURE 13 is an enlarged cross-sectional view taken substantially along line 13—13 of FIGURE 12.

Referring now to the drawings, wherein like numerals indicate like or corresponding parts throughout the several views, a motion transmitting remote control assembly constructed in accordance with the instant invention is generally shown at 10. The motion transmitting remote control assembly utilizes a conduit, generally indicated at 12, which includes an inner tubular member 14 of organic polymeric material having a bore of substantially uniform cross section throughout its entire length for movably supporting a motion transmitting core element 16. A plurality of wires 18 are wrapped helically about the inner tubular member 14 on a long lead. The wires 18 are shiftable relative to the inner tubular member 14 and relative to the casing 20 so that the conduit 12 is flexible. An outer smooth tubular casing 20 of organic polymeric thermoplastic material surrounds and encloses the wires 18 and the inner tubular member 14. While the inner tubular member 14 may be made of various organic polymeric materials, it is preferred that it be made of an extruded organic polymeric material having inherent lubricity. Highly desirable materials are the superpolyamide resins, commonly known as nylon, and polytetrafluoroethylene, also known as Teflon. Also, in some environments, less expensive organic polymeric materials such as polyethylene, polypropylene, etc. may be used to advantage. Any of the aforementioned organic polymeric materials may also be used for the casing 20 although polyethylene, polypropylene, etc. are preferable.

The casing 20 has irregularities preformed in the surface thereof without bending the wires 18 and while maintaining the inner diameter of the casing 20 substantially constant so as not to deform the inner tubular member 14, which would interfere with the movement of the motion transmitting core element 16. In one preferred form, the irregularities in the casing 20 comprise the annular grooves 22 disposed circumferentially about the casing 20. The sides 24 of the grooves 22 are substantially perpendicular to the longitudinal axis of the conduit. The fitting, generally indicated at 26, is of organic polymeric material and molded about the casing 20 with portions disposed in the annular grooves 22 so that the fitting is disposed in mechanical interlocking engagement with the casing 20 of the conduit 12. It is important to note that the radial sides 24 of the grooves 22 provide well-defined interfaces to provide the mechanical interlocking engagement between the fitting and the casing. The fitting 26 is adapted to be attached to a support by the flange 28 and the hole 30. The fitting 26 is also molded to include a cap 32 which abuts the end of the conduit and has a hole therein for movably supporting the motion transmitting core element 16. Preferably, there is also included the projections 34 which extend radially from the casing 20 so that when the fitting 26 is molded about the casing 20 it encapsulates the projections 34, thus increasing the force necessary to pull the conduit 12 from the fitting 26.

The grooves 22 are preformed in the casing 20 of the conduit 12 by moving two relatively movable members 36 and 38 toward one another to surround the casing 20, as best illustrated in FIGURES 5. Each of the members 36 and 38 has a semicircular recess 40 therein and includes raised portions comprising the annular rings 42 which deform the casing 20 for forming the annular grooves 22. Preferably, the members 36 and 38 are moved together to force the organic polymeric material of the casing 20 to move from the areas where the grooves 22 are formed in the casing 20 to a position between the members 36 and 38, which is indicated in dashed lines in FIGURE 5, to form the projections 34. Normally, a mandrel is inserted into the bore of the inner tubular member 14 before the members 36 and 38 are clamped onto the conduit to maintain the diameter of the bore in the inner tubular element 14; however, such a mandrel is not necessary in all instances.

In another preferred form, the irregularities in the casing 20 of the conduit are formed by the two relatively movable members 46 and 48, as best illustrated in FIGURE 5. The members 46 and 48 each have a semicircular recess 50 so that the members 46 and 48 may be moved toward one another to surround the conduit 12. The members 46 and 48 include raised portions comprising a plurality of spikes 52. The spikes 52 form irregularities in the conduit and, as is best illustrated in FIGURES 1 and 3, a fitting, generally indicated at 54, is molded about the casing 20 of the conduit so that portions 56 of the fitting 54 are disposed in the irregularities formed by the spikes 52 whereby the fitting 54 is disposed in mechanical interlocking engagement with the casing 20 of the conduit 12.

It will be understood that the members 36 and 38 may be positioned adjacent the end of a conduit to form the annular grooves 22 in the conduit or, alternatively, the members 46 and 48 may be utilized; but in either case, the conduit will have been previously severed. Normally, the conduit 12 is fabricated in one continuous length by an extrusion process and is thereafter severed into predetermined lengths for forming the motion transmitting remote control assemblies. Normally, the continuous length of conduit is advanced a predetermined length and grasped between relatively movable members or jaws adjacent to a position where it is severed to provide a piece of conduit for use in a remote control assembly. After being severed, the conduit is advanced another predetermined length and severed again to produce a second piece of conduit for utilization in a remote control assembly. In the method as illustrated in FIGURE 5, the conduit 12 is being severed into predetermined lengths by the cutting element 51. The respective pairs of relatively movable members 36, 38 and 46 and 48 engage the conduit 12 on each side of the cutting element 51. Thus, irregularities are formed in the casing 20 of the conduit 12 adjacent the respective ends of the pieces of conduit to be utilized in the motion transmitting remote control assembly. It is to be understood that two pair of relatively movable members 36 and 38 may be utilized instead of utilizing the members 46 and 48 and conversely two pair of relatively movable members 46 and 48 may be utilized instead of utilizing the relatively movable members 36 and 38.

In another form, the relatively movable members comprise a pair of juxtaposed rotatable roller-like elements 66 and 68, as illustrated in FIGURES 8 and 9. The roller-like elements 66 and 68 each have a recess 70 thereabout with raised portions 72 disposed in the recesses. The conduit is passed between the roller-like elements 66 and 68 so as to be disposed in the recesses 70 as the roller-like elements 66 and 68 rotate whereby the raised portions 72 deform the conduit 12 to form the irregularities 74 along the conduit. In forming the irregularities 74 in the conduit 12 as illustrated in FIGURES 8 and 9, the entire length of the conduit 12 is so deformed; however, fittings are normally molded about only the ends of each predetermined length of the conduit utilized for a motion transmitting remote control assembly. It will be understood that the raised portions 72 in the recesses 70 of the roller-like elements 66 and 68 may take any appropriate form to form many various patterns on the conduit 12.

Another form is illustrated in FIGURE 10 wherein the conduit 12 is moved axially and a cutting element 76 is positioned in contact with the outer surface of the conduit 12. The cutting element 76 is rotated about the conduit 12 to cut the irregularities taking the form of a helical groove 78 in the outer surface of the conduit. Alternatively, the cutting element 78 may be maintained stationary while the conduit 12 is rotated.

Another form is illustrated in FIGURE 11 wherein relatively movable members 80 and 82 are axially spaced along the conduit 12 and respectively surround the conduit. The members 80 and 82 may be hinge-type clamp members or in any other appropriate form to engage and surround to the conduit 12. The members 80 and 82 tightly engage the outer casing 20 of the conduit 12 and are moved relative to one another axially along the conduit to force the organic polymeric material of the outer surface of the casing 20 of the conduit 12 into a projection 84. In some instances, it is preferable to heat the outer casing 20 of the conduit 12 so that the projection 84 is more easily formed. The mandrel 86 is disposed in the bore of the inner tubular member 14 before the members 80 and 82 are placed into tight engagement about the casing 20. A mandrel, such as mandrel 86, may be utilized in the other forms discussed hereinabove. A fitting of organic polymeric material is then molded about the conduit 12 and about the projection 84 so that the fitting is disposed in mechanical interlocking engagement with the casing 20 of the conduit 12.

Another form is illustrated in FIGURES 12 and 13 wherein there is shown the members 88 and 90 disposed about the conduit 12. The members 88 and 90 include recesses 91 for contacting the conduit with cavities 92 extending into the members away from the surface of the conduit and heating elements 94. The members 88 and 90 are placed about the conduit 12 and the conduit 12 is heated so that the organic polymeric material of the casing 20 moves into the cavities 92 to form projections on the conduit. A fitting of organic polymeric material is then molded about the conduit to encapsulate the projections formed by the cavities 92 so that the fitting is in mechanical interlocking engagement with the casing 20 of the conduit 12.

As alluded to hereinbefore, the preforming of the conduit 12 to provide irregularities in the organic polymeric outer surface thereof provides a motion transmitting remote control assembly wherein a fitting of organic polymeric material is molded about the conduit and in mechanical interlocking engagement with the conduit such that a high degree of pull-off strength is attained, i.e., a high amount of force is necessary to pull the conduit from the fitting. Such an assembly particularly solves the problem where it is necessary to mold the end fitting of an organic polymeric material which is incompatible for bonding to the organic polymeric material of the outer surface of the conduit. Various organic polymeric materials are suitable for forming the fittings molded about the conduit; however, because of the high degree of shrinkage as compared to other organic polymeric materials, acetal resins are preferred for forming the fittings.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described.

The embodiments of the invention in which an exclusive property or privilege is claimed are defined as follows:

1. A motion transmitting remote control assembly comprising a flexible conduit including an inner tubular member of low friction organic polymeric material defining a bore of substantially uniform cross section throughout the length thereof, a plurality of wires wrapped helically about said inner tubular member on a long lead and being shiftable relative to said inner tubular member as said conduit is flexed and an outer tubular casing of organic polymeric material enclosing said wires and said inner tubular member and including irregularities preformed in the surface thereof without bending said wires and while the inner diameter of said casing is maintained substantially constant, and a fitting of organic polymeric material molded on said outer tubular casing and about said irregularities so that said fitting is disposed in mechanical interlocking engagement with said casing to prevent relative axial movement between said fitting and said casing of said conduit, said fitting being adapted for attachment to a support structure.

2. A motion transmitting remote control assembly as set forth in claim 1 wherein said irregularities in said casing comprise at least one annular groove formed by compressing said casing while maintaining the inner diameter thereof substantially constant, said fitting being molded about said casing to include portions disposed in said groove to provide said mechanical interlocking engagement.

3. A motion transmitting remote control assembly as set forth in claim 2 wherein said irregularities in said casing further include projections extending radially therefrom and formed of organic polymeric material which is displaced as said groove is formed, said fitting being molded about said projections so as to be in mechanical interlocking engagement therewith.

4. A motion transmitting remote control assembly as set forth in claim 1 wherein said irregularities in said casing comprise spike holes formed by forcing a plurality of spikes into said casing, said fitting being molded about said casing to include portions thereof disposed in said spike holes to provide said mechanical interlocking engagement.

5. A motion transmitting remote control assembly as set forth in claim 1 wherein said irregularities in said casing comprise a pattern of depressions preformed along the entire length of said conduit, said fitting being molded about only a portion of the length of said casing to include portions disposed in said depressions to form said mechanical interlocking engagement.

6. A motion transmitting remote control assembly as set forth in claim 1 wherein said irregularities in said casing include at least one projection extending radially from said casing and formed of the organic polymeric material of said casing, said fitting being molded about said projection to form said mechanical interlocking engagement.

7. A motion transmitting remote control assembly as set forth in claim 6 wherein said projection is formed by axially compressing said casing to force the organic polymeric material thereof into said projection.

8. A motion transmitting remote control assembly as set forth in claim 6 wherein said projection is formed by heating said casing while surrounded by means in contact with said casing and having at least one cavity therein.

9. A motion transmitting remote control assembly as set forth in claim 6 wherein said projection is formed as said casing is radially compressed to move some of the organic polymeric material thereof to form said projection.

10. A motion transmitting remote control assembly as set forth in claim 1 wherein said irregularities in said casing are formed by at least one groove cut into said casing without extending therethrough.

11. A motion transmitting remote control assembly transmitting core element movably disposed in said bore set forth in claim 1 wherein said fitting is molded about an end of said conduit and includes a cap abutting the end of said conduit and having a hole therein, and a motion of said inner tubular member and extending through said hole in said fitting.

12. A motion transmitting remote control assembly as set forth in claim 1 wherein said organic polymeric material of said fitting is incompatible for bonding to the organic polymeric material of said casing.

13. A motion transmitting remote control assembly as set forth in claim 12 wherein said organic polymeric material of said fitting is an acetal resin.

14. A motion transmitting remote control assembly comprising a flexible conduit including; an inner tubular member of low friction organic polymeric material, a plurality of wires helically disposed about said inner tubular member on a long lead and being shiftable relative to said inner tubular member as said conduit is flexed, an outer tubular casing of organic polymeric material enclosing said wires and said inner tubular member, irregularities disposed in the surface of said casing, said wires extending in a substantially constant path along said conduit without substantial deviation from said path adjacent said irregularities, said inner tubular member having a bore of substantially uniform cross section throughout the length of said conduit including any portion having said irregularities in said casing thereof, and a fitting of organic polymeric material disposed on said casing and in mechanical interlocking engagement with said irregularities to prevent relative axial movement between said casing of said conduit and said fitting.

15. A motion transmitting remote control assembly as set forth in claim 14 wherein said irregularities comprise a plurality of annular grooves, each of said grooves being endless and extending circumferentially about said casing and being spaced axially along said casing from adjacent grooves.

16. A motion transmitting remote control assembly as set forth in claim 15 wherein said casing has a substantially smooth and continuous surface extending circumferentially thereabout in the axial space between said grooves.

17. A motion transmitting remote control assembly as set forth in claim 15 wherein said irregularities include projections extending radially from said casing in said grooves.

18. A motion transmitting remote control assembly as set forth in claim 17 wherein each of said grooves includes at least one wall which extends radially relative to the axis of said casing so as to be substantially perpendicular to the outer surface of said casing.

19. A motion transmitting remote control assembly as set forth in claim 18 wherein each groove has only one pair of said projections extending radially therefrom, and each of said projections extends radially outward beyond the outer surface of said casing, said fitting being disposed about said casing and in mechanical interlocking engagement with said grooves and said projections.

20. A motion transmitting remote control assembly as set forth in claim 19 wherein said casing has a substantially smooth and continuous surface extending circumferentially thereabout in the axial space between said grooves.

21. A motion transmitting remote control aassembly as set forth in claim 19 wherein said fitting includes a flange integral therewith, said flange having at least one hole therethrough for receiving a fastener to secure said fitting to a support structure.

References Cited

UNITED STATES PATENTS

| | | | |
|---|---|---|---|
| 2,583,026 | 1/1952 | Swift | 264—274 X |
| 2,688,581 | 9/1954 | Stubbs | 264—273 X |
| 3,190,084 | 6/1965 | Moon et al. | 74—501 X |
| 3,263,520 | 8/1966 | Tschanz. | |

MILTON KAUFMAN, *Primary Examiner.*

U.S. Cl. X.R.

74—501; 264—274

UNITED STATES PATENT OFFICE

CERTIFICATE OF CORRECTION

Patent No. 3,434,501                                            March 25, 1969

Winthrop B. Conrad

It is certified that error appears in the above identified patent and that said Letters Patent are hereby corrected as shown below:

Column 1, line 40, "adevice" should read -- a device --. Column 4, line 34, "FIGURES" should read -- FIGURE --. Column 5, line 51, cancel "to". Column 7, line 34, cancel "transmitting core element movably disposed in said bore" and insert the same after "a motion" in line 37, same column 7. Column 8, line 40, "aassembly" should read -- assembly --.

Signed and sealed this 7th day of April 1970.

(SEAL)
Attest:

Edward M. Fletcher, Jr.                                  WILLIAM E. SCHUYLER, JR.

Attesting Officer                                                Commissioner of Patents